United States Patent [19]
Mead et al.

[11] Patent Number: 6,067,119
[45] Date of Patent: May 23, 2000

[54] HIERARCHICAL LOW LATENCY VIDEO COMPRESSION

[75] Inventors: Donald C. Mead, Carlsbad; Ram Nagarajan, Los Angeles; Peter H. Au, Hermosa Beach, all of Calif.

[73] Assignee: Hughes Electronics Corporation, El Segundo, Calif.

[21] Appl. No.: 09/181,413

[22] Filed: Oct. 28, 1998

Related U.S. Application Data

[62] Division of application No. 08/745,568, Nov. 8, 1996.
[51] Int. Cl.[7] ........................................ G06F 15/00
[52] U.S. Cl. ............................................. 348/428
[58] Field of Search .................... 345/428, 440, 345/441, 132, 127

[56] References Cited

U.S. PATENT DOCUMENTS

| | | | |
|---|---|---|---|
| 5,430,486 | 7/1995 | Fraser et al. | 395/426 |
| 5,517,246 | 5/1996 | Suzuki | 348/412 |
| 5,886,743 | 3/1999 | Oh et al. | 345/428 |

*Primary Examiner*—Phu K. Nguyen
*Attorney, Agent, or Firm*—John A. Crook; Michael W. Sales

[57] ABSTRACT

A method for displaying a video sequence depicting motion of at least one video object by sequential presentation of a plurality of frames includes storing a low resolution representation of the video object, generating and displaying a first frame of the sequence based on the low resolution representation, updating the low resolution representation, and generating and displaying a subsequent frame of the sequence based on the updated representation. The method may include calculating a quality metric to determine when updating is necessary.

4 Claims, 3 Drawing Sheets

HIERARCHICAL LOW LATENCY VIDEO COMPRESSION

This is a division of application Ser. No. 08/745,568 filed Nov. 8, 1996.

TECHNICAL FIELD

The present invention relates to transmission of digital video sequences to reduce transmission latency and improve quality.

BACKGROUND ART

Digital video technology is used in a growing number of applications such as cable television, direct broadcast satellite services, high-definition television, and the like. Digital representations of video signals often require a very large number of bits. As such, a number of systems and methods are currently being developed to accommodate transmission and storage of still images and video sequences using various types of compression technology implemented in both hardware and software.

The availability of economically feasible and increasingly more powerful microprocessors allows integration of natural and synthetic audio and video sequences. Information in the form of audio and video sequences may be integrated to present real-time and non-real-time information in a single sequence. To provide audio and video sequences having acceptable quality, using diverse communication channels having various bandwidths and associated communication rates, requires continuous improvement to obtain higher compression ratios and reduction of the delays or latencies due to encoding, transmission, decoding, and compositing.

In general, quality, in the form of resolution, is compromised to obtain an accessible latency for a particular limited bandwidth system. However, it is desirable to provide a method for reducing latency which does not result in such a quality reduction as perceived by the viewer.

An audio/visual (AV) object may be used to represent a physical (real) or virtual article. AV objects may be defined in terms of other AV objects which are referred to as sub-objects. An AV object which is not a composite or a compound AV object is referred to as a primitive. A sprite object is an AV object created within a block of pixels that can be manipulated as a unit using geometrical transformations. Rather than re-transmitting and re-displaying the sprite object, new transformation parameters are provided to generate subsequent video frames. This results in a significant reduction in the amount of data necessary to represent such frames.

Sprite objects have a number of applications in computer graphics, animation, and digital video. A small sprite object may represent a character in a video game whereas a large sprite object may represent an image which is larger than an individual frame. For example, a still image of a video layer of a scene, such as the background of a room, may be represented by a large sprite object. A particular video sequence which represents a camera panning across the room would have a number of frames to depict motion of the camera. Rather than transmitting a still image for each frame, only the transformation parameters are required to manipulate a portion of the sprite image which is reused multiple times as the video frames are generated.

A prior art method of displaying a digital video sequence using sprites requires the sprites to be encoded and transmitted at the beginning of the video sequence. Transformation parameters are then transmitted and applied to generate the various frames for the sequence. This results in a significant delay or high latency before beginning display of the video sequence because the sprite objects must be available to a decoder before any frames can be reconstructed and displayed using the transformation parameters. In addition, the spite object (basis object) is traditionally fixed after it has been transmitted and stored at the beginning of the encoded video sequence.

SUMMARY OF THE INVENTION

As such, one object of the present invention is to provide a method for reducing the latency associated with transmitting a high quality video sequence over a limited bandwidth channel.

It is a further object of the present invention to provide a method for displaying a video sequence depicting motion using sprite objects to reduce the latency associated with prior art methods.

A further object of the present invention is to provide a method for re presenting a high quality video sequence generated from a sprite object having a progressively updated resolution.

In carrying out the above objects and other objects and features of the present invention, a method is provided for reducing latency associated with transmitting a motion video sequence having a plurality of frames derived from at least one video object over a limited bandwidth channel. The method includes encoding the video object to generate a first representation having an associated first resolution, encoding transform parameters corresponding to the first frame, and transmitting the first representation along with the transform parameters for the first frame over the limited bandwidth channel. The method also includes decoding the first representation and the corresponding transform parameters to display the first frame so as to reduce latency. A residual representation of the object is subsequently transmitted and combined with the first representation to update the object by improving its resolution. The updated object is then used in generation of subsequent frames in the motion video sequence. The method may also include a quality metric to determine when a residual representation should be transmitted.

The present invention also provides a method for displaying a video sequence depicting motion of a video object by sequential presentation of a plurality of frames. The method includes storing a low resolution representation of the object and generating and displaying the first frame based on a geometric transformation of the low resolution representation so as to reduce the latency. The method also includes updating the low resolution representation using a residual representation which is based on the difference between the low resolution representation and the object. The residual representation may be used to progressively update the resolution of the object. The subsequent frames are then generated and displayed based on geometric transformations of the updated representation.

The advantages accruing to the present invention are numerous. For example, the present invention reduces the latency associated with transmitting a high quality video sequence over a limited fixed bandwidth channel. The present invention exploits aspects of human psychophysics in that a viewer is not as perceptive to the quality of an image at the beginning of a sequence or scene change due to the large volume of new information. As the sequence progresses, the viewer becomes more perceptive to the image quality. As such, the present invention allows for the sequence to be decoded and displayed with low latency by using a lower resolution for the first frames of a new sequence or scene, while progressively updating the quality of the objects with a residual image to provide a higher resolution. The present invention also allows the quality of the sprite (basis) object to be improved after it has been transmitted and stored by the decoder such that any arbitrarily selected quality level of the original basis object or sprite may be achieved (limited by the original object) based on available bandwidth.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
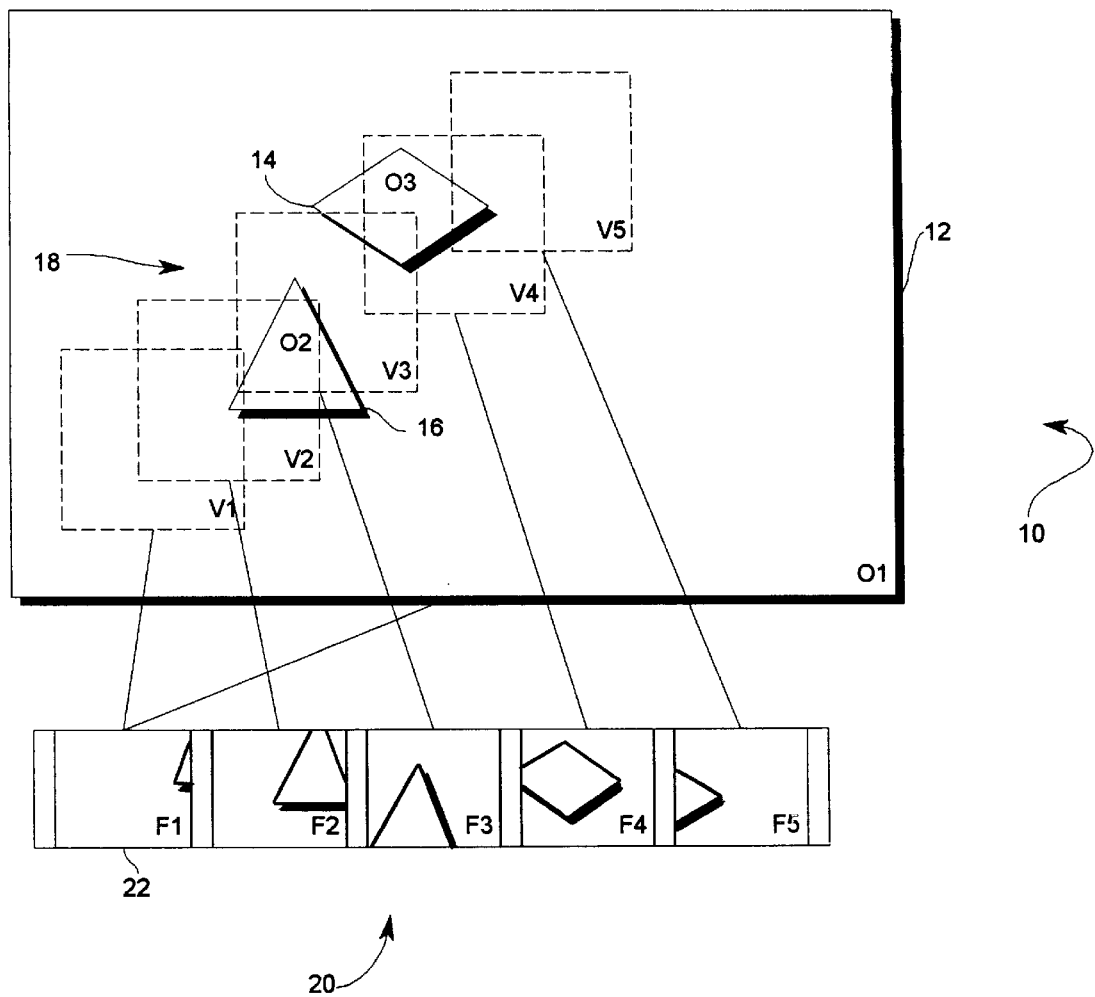
FIG. 1 is a graphical representation of various video objects represented in frames of a video sequence.

Referring now to FIG. 1, a graphical representation of a video scene represented by a plurality of frames is shown. Scene 10 includes a number of video objects (O1–O3), any one or more of which may be designated as basis objects or sprite objects. Object 12 may represent the background of scene 10 while object 14 represents a real object and object 16 represents a virtual or synthetic object. A number of views (V1–V5), indicated generally by reference numeral 18 are represented by a video sequence 20 having a plurality of frames (F1–F5), such as frame 22. In the example illustrated in FIG. 1, a camera pans from view V1 to view V5. To generate the images of sequence 20, transformation parameters are applied to the various objects 12, 14 and 16. As such, the prior art methods require at least object 12 and object 16 to be transmitted and decoded along with the corresponding transformation parameters prior to display of frame 22. This may result in a significant delay due the large amount of data which must be transferred. As explained in greater detail below, the present invention transmits a lower resolution representation of objects 12 and 16 to reduce the delay before generation and display of frame 22.

Figure 2A:
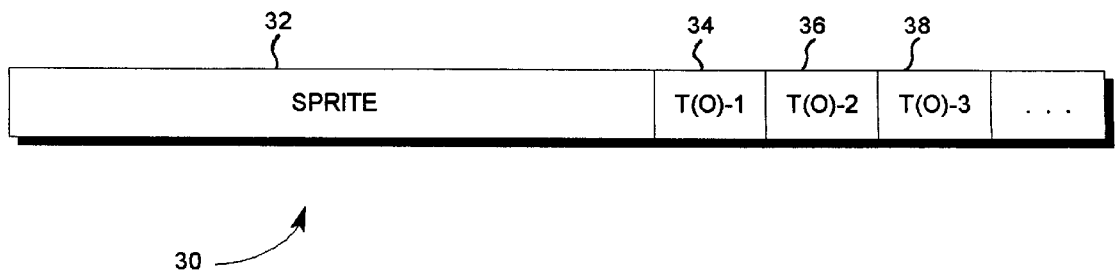
FIG. 2a is a graphical representation of a prior art data stream for a video sequence.

Referring now to FIG. 2a, a graphical representation of a data stream for a video sequence using a prior art method is shown. Data stream 30 includes data representing a sprite or basis object 32 followed by transformation parameters for one or more objects corresponding to frames 1, 2 and 3, as represented generally by reference numerals 34, 36 and 38, respectively. The prior art method requires transmission of the sprite object 32 along with at least transformation parameters 34 before frame generation may begin. This leads to latency and image quality which are totally dependent upon the size of sprite object 32 and the available bandwidth of the communication channel. With large sprite objects and a limited bandwidth, playback of the video sequence is characterized by a long delay (or high latency). Alternatively, image quality may be compromised due to the constraints imposed by the maximum allowable latency, the size of the sprite object, and the available bandwidth. Once a sprite object 32 is received, it is stored by the decoder which then applies transformation parameters 34, 36 and 38 to generate subsequent frames of the video sequence. Once stored, the prior art method does not allow sprite object 32 to be updated without retransmitting the entire object.

Figure 2B:
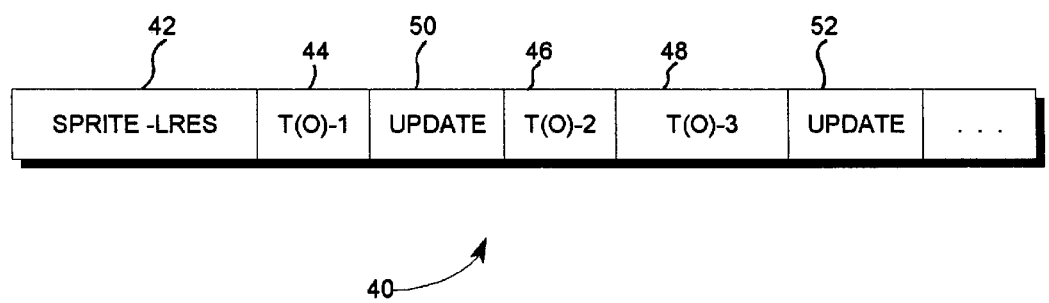
FIG. 2b is a graphical representation of a data stream for a video sequence according to the present invention.

Referring now to FIG. 2b, a graphical representation of a data stream for a video sequence according to the present invention is shown. Data stream 40 includes data representing a low resolution sprite object 42, transformation parameters corresponding to various frames and/or objects, represented generally by reference numerals 44, 46 and 48, and residual update data 50 and 52.

Sprite object 42 is encoded to generate a first representation having an associated first resolution which may be based on the number or levels of quantization. A lower number of quantization levels or higher quantization step size results in a coarser approximation or lower resolution of sprite object 42. Accordingly, less data is required to represent sprite object 42. The low resolution representation is transmitted along with corresponding transformation parameters. As such, the present invention allows generation and display of the first frame in a significantly shorter amount of time due to the reduction in the amount of data required to represent the sprite object. A residual representation, as represented by block 50, is transmitted to update the sprite object when bandwidth is available. As such, if a greater amount of the available bandwidth must be allocated to transformation parameters, as indicated by block 48, a residual representation is not transmitted at that time.

Figure 3:
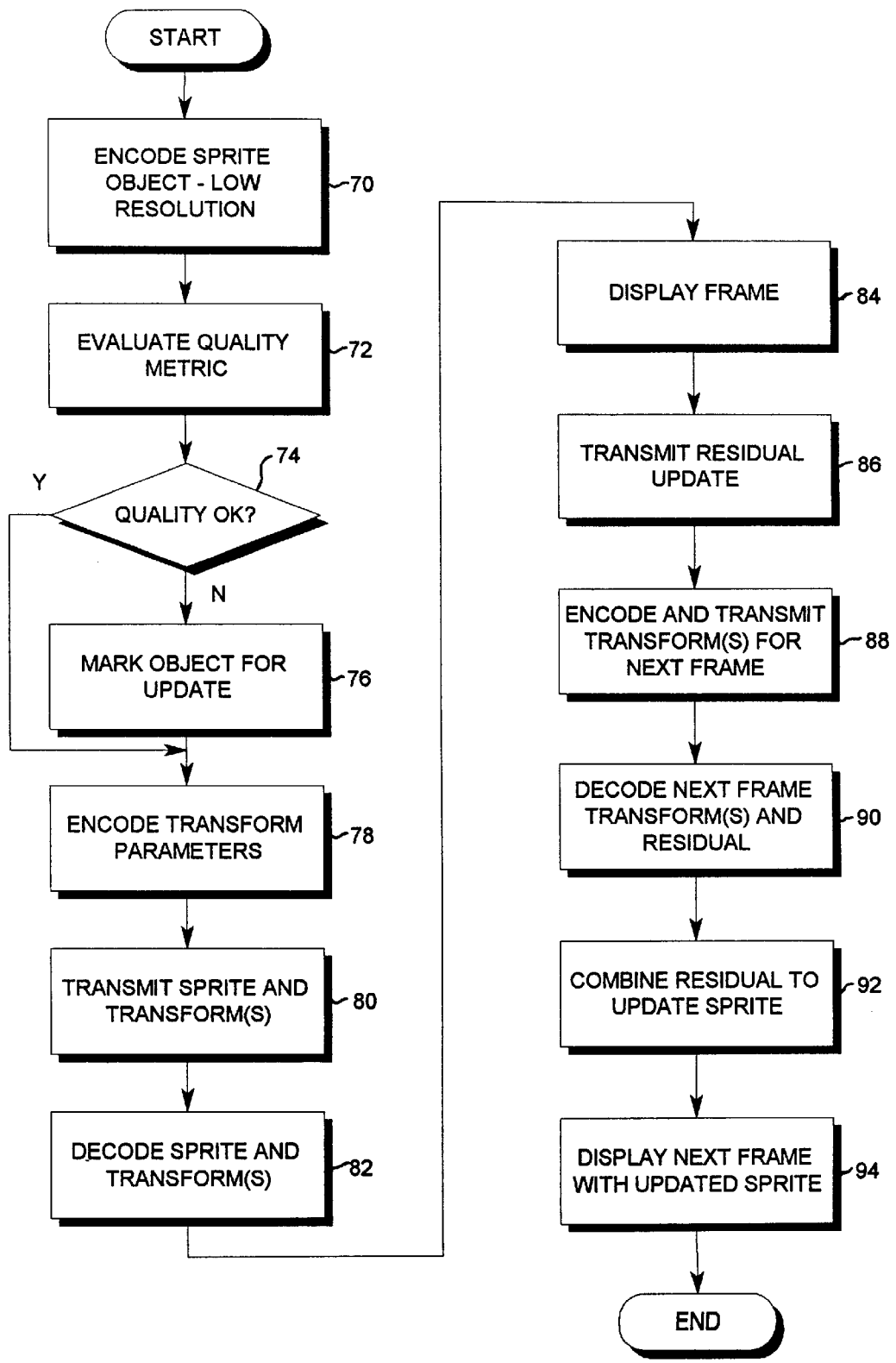
FIG. 3 is a flow diagram representing operation of a system or method according to the present invention.

Referring now to FIG. 3, a flow diagram illustrating operation of a system and method according to the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

Block 70 represents encoding of at least one video object, such as a sprite object, to generate a first representation of the object. As used herein, the term "low resolution" is intended to mean any lower quality or lower bandwidth representation of the original object. For example, a highly quantized version (i.e. fewer quantization levels) in compression algorithms which utilize transforms such as the discrete cosine transform (DCT). Alternatively, a spatially downsampled version of the original, or a low hierarchical level of the image transform with the wavelet transform may be utilized as well.

Block 72 represents determination of the quality of the representation encoded by block 70 using a quality metric. In a preferred embodiment, the quality metric is based on the signal-to-noise ratio (SNR) calculated as follows:

$$MSE = \frac{\sum_N (O_i - R_i)^2}{N} - \left(\frac{\sum_N (O_i - R_i)}{N}\right)^2$$

$$SNR = 10 * \log_{10}(255 * 255 / MSE)$$

where:

$O_i$=ith pixel value of original sprite object piece; $R_i$=ith pixel value of reconstructed sprite object piece;

N=number of pixels in sprite object piece; and MSE represents the mean squared error. The value of the quality metric determined by block 72 is then compared to a predetermined threshold or desired SNR as represented by block 74. When the quality of a particular representation is below the desired quality, that object is marked as indicated by block 76 for subsequent updating. During this phase, the lowest quantizer step size which satisfies the bit rate requirements is used.

Block 78 of FIG. 3 represents encoding one or more transform parameters corresponding to at least the first frame in the video sequence. The encoded transforms along with the low resolution sprite object are transmitted as indicated by block 80. A decoder decodes the low resolution sprite object and corresponding transform parameters to display the first frame so as to reduce the associated latency as indicated by blocks 82 and 84, respectively. To improve low quality regions of the transmitted sprite object, residual representations may be encoded and transmitted as indicated by block 86. The residual representations are combined with the first representation (or last updated representation) of the sprite object to improve any low quality, low resolution regions. Residual representations may be set at any time based on the timing constraints and available bandwidth. For example, as long as the delivery of the next sprite object and/or transform can be delayed, a residual representation can be transmitted to update the first representation of the sprite object. The residual representation is thus transmitted during a frame where transmission of the associated transformation parameters requires less bandwidth than that available over the limited bandwidth channel.

In a preferred embodiment, the residual representation is based on the difference between the video object and a previously generated representation of the video object. To further improve efficiency, the sprite object or region thereof may be analyzed to determine if an update is necessary, i.e. an update is performed only if the sprite object or portion thereof is required to generate a subsequent frame. This reduces the total number of quality update pieces which may be required.

With continuing reference to FIG. 3, one or more transformation parameters are encoded and transmitted corresponding to transformation of the sprite object for subsequent frames in the video sequence, as represented by block 88. The transformation parameters and the residual representation, when transmitted, is decoded as represented by block 90. The residual representation is combined with the current representation of the sprite object to update the sprite object as represented by block 92. Generation and display of subsequent frames use transformation parameters based on the updated sprite object as represented by block 94.

Thus, according to the present invention, the latency required to transmit a high quality representation of a video object is spread over multiple frames of the image sequence. This allows the sequence to be decoded and viewed with significantly reduced latency. As the sequence progresses, the residual images are added to the original low resolution representation resulting in a higher quality image of the object. Due to the characteristics of the human visual system, the viewer perceives a high quality video sequence, even though the first frames at the beginning of a sequence or scene change contain objects of lower resolution.

The present invention has been simulated as part of a core experiment proposal for incorporation into the MPEG 4 Standard for Coding of Moving Pictures and Associated Audio Information. Based on the simulations, the present invention provides a significant improvement as measured by subjective image quality, total number of bits used for the first frame, and total number of bits used for the whole sequence for a number of various test sequences.

While the best mode for carrying out the invention has been described in detail, those familiar with the art to which this invention relates will recognize various alternative designs and embodiments for practicing the invention as defined by the following claims.

What is claimed is:

1. A method for displaying a video sequence depicting motion of at least one video object by sequential presentation of a plurality of frames, the method comprising:

storing a low resolution representation of the at least one object;

generating and displaying a first one of the plurality of frames based on a first geometric transformation of the low resolution representation;

updating the low resolution representation using a residual representation based on a difference between the low resolution representation and the at least one object to produce an updated representation having a higher resolution; and generating and displaying a subsequent one of the plurality of frames based on a second geometric transformation and the updated representation.

2. The method of claim 1 further comprising calculating a quality metric value for the low resolution representation.

3. The method of claim 2 wherein the step of updating the low resolution representation is performed only if the quality metric value is below a predetermined threshold value.

4. The method of claim 2 wherein the step of updating the low resolution representation is performed only if the low resolution representation is required to generate a subsequent one of the plurality of frames.

* * * * *